United States Patent
Vos (10) Patent No.: US 11,104,290 B2
(45) Date of Patent: Aug. 31, 2021

(54) VEHICLE AIRBAG DOOR WITH STRESS GUIDING FEATURES

(71) Applicant: Faurecia Interior Systems, Inc., Auburn Hills, MI (US)

(72) Inventor: Kevin Vos, White Lake, MI (US)

(73) Assignee: FAURECIA INTERIOR SYSTEMS, INC., Auburn Hills, MI (US)

( * ) Notice: Subject to any disclaimer, the term of this patent is extended or adjusted under 35 U.S.C. 154(b) by 120 days.

(21) Appl. No.: 16/519,691

(22) Filed: Jul. 23, 2019

(65) Prior Publication Data

US 2021/0024025 A1    Jan. 28, 2021

(51) Int. Cl.
| | | |
|---|---|---|
| *B60R 21/215* | (2011.01) | |
| *B60R 21/2165* | (2011.01) | |
| *B60R 21/205* | (2011.01) | |

(52) U.S. Cl.
CPC ........ *B60R 21/2165* (2013.01); *B60R 21/215* (2013.01); *B60R 21/205* (2013.01); *B60R 2021/21531* (2013.01); *B60R 2021/21537* (2013.01)

(58) Field of Classification Search
CPC .......... B60R 21/2165; B60R 21/21656; B60R 21/215; B60R 2021/21537; B60R 21/2155; B60R 2021/21531
See application file for complete search history.

(56) References Cited

U.S. PATENT DOCUMENTS

| | | |
|---|---|---|
| 6,502,852 B2 | 1/2003 | Kassman et al. |
| 8,567,814 B2 | 10/2013 | Crittenden |
| 8,567,816 B1 | 10/2013 | Wisniewski et al. |
| 2002/0060446 A1 | 5/2002 | Kassman et al. |
| 2004/0108696 A1* | 6/2004 | Mar ..................... B60R 21/2165 280/732 |
| 2015/0091285 A1* | 4/2015 | Sano ..................... B60R 21/231 280/741 |

FOREIGN PATENT DOCUMENTS

| | | | |
|---|---|---|---|
| FR | 2780687 A1 | 1/2000 | |
| FR | 3013011 A1 * | 5/2015 | ........... B60R 21/205 |
| JP | 2008201325 A | 9/2008 | |
| JP | 2010023620 A | 2/2010 | |
| WO | WO-03002374 A2 * | 1/2003 | ......... B60R 21/2165 |
| WO | WO2012159010 A2 | 11/2012 | |

OTHER PUBLICATIONS

Machine translation of FR-3013011-A1 obtained from dialogue. proquest.com Jan. 12 (Year: 2021).*

* cited by examiner

*Primary Examiner* — Paul N Dickson
*Assistant Examiner* — Maxwell L Meshaka
(74) *Attorney, Agent, or Firm* — Reising Ethington P.C.

(57) ABSTRACT

A vehicle interior panel for use over a deployable airbag includes a substrate that splits during airbag deployment to form an airbag door on one side of a tear seam that pivots away from another portion of the substrate on an opposite side of the tear seam. One or more relief lines are formed in the substrate in a manner that allows the airbag door to preferentially bend along each relief line during airbag deployment. This bending concentrates forces from the deploying airbag to particular and sequential portions of the tear seam to improve tear seam function.

17 Claims, 5 Drawing Sheets

VEHICLE AIRBAG DOOR WITH STRESS GUIDING FEATURES

TECHNICAL FIELD

The present disclosure is related generally to vehicle interior panels and, more particularly, to vehicle interior panels through which an airbag can deploy.

BACKGROUND

Airbags are commonly employed safety devices in vehicle interiors, but their presence is often entirely unknown to vehicle occupants until deployed in the event of a relatively severe collision. This is because undeployed airbags are hidden from view, typically behind a decorative panel that provides the passenger cabin of the vehicle with a desired aesthetic by concealing other vehicle components that are strictly utilitarian. Some decorative panels are specifically designed so that an opening is formed through the panel during airbag deployment at a location where only a solid surface was apparent before airbag deployment. A continual challenge for vehicle interior manufacturers has been providing a panel through which a deployment opening can be successfully formed while also making the future location of the opening invisible to vehicle occupants.

U.S. Pat. No. 8,567,816 to Wisniewski et al. discloses a vehicle interior panel for use over an airbag. The panel includes a substrate having an airbag door region and a decorative covering disposed over the airbag door region. The Wisniewski patent is related to improving the function of a tear seam formed in the decorative covering by providing the tear seam in a special shape different from that of the underlying airbag door. While this idea represented a breakthrough in the art of vehicle interior panels and airbag deployment technology, it did not address any problems related to formation of the underlying airbag door.

SUMMARY

An illustrative vehicle interior panel for use over a deployable airbag includes a substrate and a relief line formed in the substrate. The substrate is configured to split along a tear seam during airbag deployment to form an airbag door on one side of the tear seam that pivots about a hinge and away from a portion of the substrate on an opposite side of the tear seam. The relief line extends from the tear seam on the airbag door side of the tear seam and is configured to allow the airbag door to preferentially bend along the relief line during airbag deployment.

In various embodiments, the relief line extends from the tear seam toward the hinge.

In various embodiments, the relief line extends from the tear seam to the hinge.

In various embodiments, the relief line is one of a plurality of relief lines, and each relief line extends from a different point along the tear seam.

In various embodiments including a plurality of relief lines, each of which extends from a different point along the tear seam:
- each relief line may extend from the tear seam toward the hinge;
- each relief line may extend from the tear seam to the hinge;
- each relief line may extend from the tear seam to a common location along the hinge;
- each relief line may extend from the tear seam to a different location along the hinge;
- at least two relief lines may extend from the tear seam to a first location along the hinge, and at least two other relief lines may extend from the tear seam to a different second location along the hinge;
- one of the relief lines extending to a first location along the hinge may be parallel with one of the relief lines extending to a different second location along the hinge;
- at least one of the different points along the tear seam may correspond to a leading edge of the airbag door, and another one of the different points along the tear seam may correspond to a different edge of the airbag door;
- at least two of the different points along the tear seam may correspond to a leading edge of the airbag door and another one of the different points along the tear seam may correspond to a different edge of the airbag door; and/or
- the plurality of relief lines may include first, second, and third pairs of relief lines with each pair including one relief line extending to a first location along the hinge and another relief line extending to a different second location along the hinge, with the relief lines of the first pair being parallel with each other, the relief lines of the second pair extending from respective points along the tear seam corresponding to a leading edge of the airbag door, and the relief lines of the third pair extending from respective points along the tear seam corresponding to a different edge of the airbag door.

In various embodiments, the relief line includes a channel formed along a side of the substrate facing the deployable airbag when installed in a vehicle.

In various embodiments, the substrate is formed in part by a closed end of an airbag module configured for attachment to a base portion of the substrate at an opening formed through the base portion.

It is contemplated than any of the above-listed features can be combined with any other feature or features of the above-described embodiments or the features described below and/or depicted in the drawings, except where there is an incompatibility of features.

BRIEF DESCRIPTION OF THE DRAWINGS

Illustrative embodiments will hereinafter be described in conjunction with the following figures, wherein like numerals denote like elements, and wherein.

DESCRIPTION OF ILLUSTRATIVE EMBODIMENTS

Described below is a vehicle interior panel configured to advantageously manage stresses applied to the panel by an inflating airbag to improve tear seam function and airbag door formation. Features may be included in the panel that direct airbag deployment forces to specific concentrated points along the tear seam to ensure proper splitting of the panel at those locations along the tear seam before the available deployment forces are permitted to reach other points along the tear seam.

Figure 1:
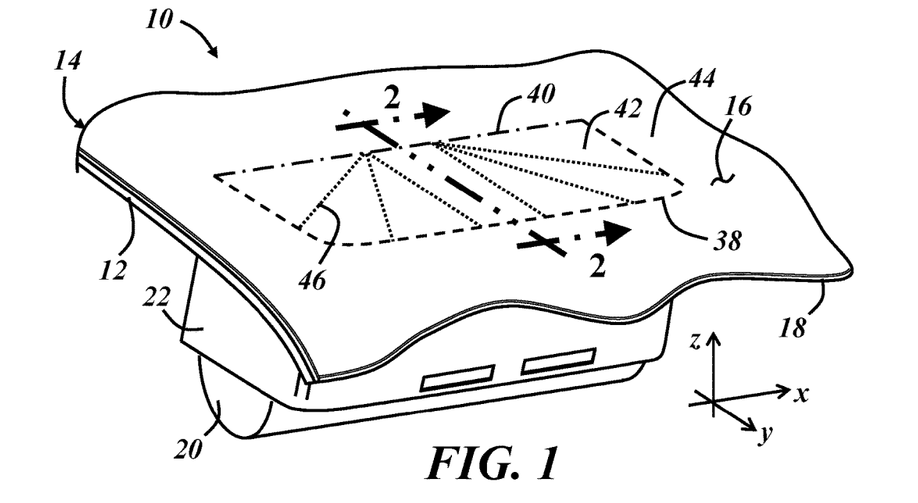
FIG. 1 is a perspective view of a portion of a vehicle interior panel configured to split along a tear seam during deployment of an underlying airbag.

FIG. 1 is a perspective view of a portion of a vehicle interior panel 10 for use over a deployable airbag. The illustrated panel 10 is intended for use on the passenger side of a vehicle instrument panel, but the following description is applicable to any vehicle interior panel, such as that of a vehicle door, steering wheel, console, roof, pillar, seat, etc. The panel 10 includes a substrate 12 and a decorative covering 14 overlying the substrate. The substrate 12 provides the overall size and shape of the panel 10 and is sufficiently rigid to maintain its shape in a vehicle interior. Exemplary substrates are made from or include injection molded materials such as semi-rigid thermoplastic materials (e.g., filled or unfilled polyolefins or thermoplastic elastomers) having a nominal thickness in a range from 2.0 mm to 4.0 mm.

The decorative covering 14 provides the panel 10 with a desired aesthetic and may be a multilayer component including an outer decorative layer 16 (e.g., leather, simulated leather, fabric, etc.) that faces the interior of the passenger cabin of the vehicle when installed and one or more underlying layers 18, such as an elastic foam layer that provides the panel with a cushion-like character. The covering 14 can be provided as a one-piece upholstery-like component separately from the substrate 12 and then attached to the substrate, or a portion of the covering such as a foam layer can be formed in place between the decorative layer 16 and the substrate during assembly of the panel 10. The covering 14 can be a simpler decorative layer, such as a single layer of paint or film, or more complex layer, such as a touch sensitive or illuminated thin film device.

Figure 2:
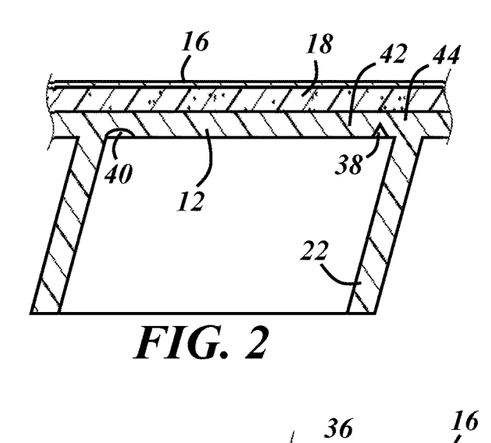
FIG. 2 is a cross-sectional view of the vehicle interior panel of FIG. 1, illustrating an integral airbag chute.
Figure 3:
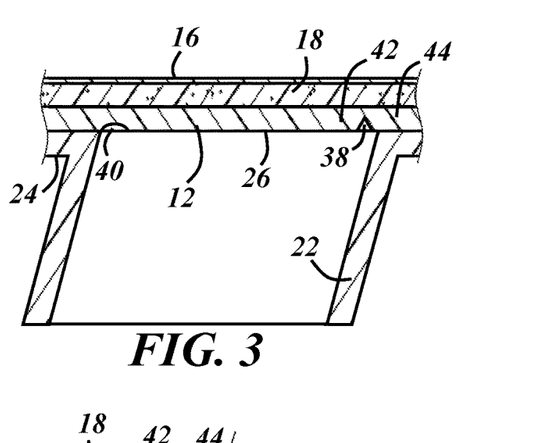
FIG. 3 is a cross-sectional view of an alternative construction of the vehicle interior panel of FIG. 1, illustrating a separately formed airbag chute.

In this example, the deployable airbag is housed in a canister 20 beneath the substrate 12 and adjacent to a chute 22. The airbag is in a deflated state and configured to inflate in a vehicle collision, and the chute 22 restricts airbag inflation to a direction toward the passenger cabin. The chute 22 may be integrally formed as one injection-molded piece with the substrate 12, as shown in FIG. 2. Alternatively, the chute 22 may be formed separately from the substrate 12 as in FIG. 3, where the chute is formed with a flange 24 and attached to an inner side 26 of the substrate 14.

Figure 4:
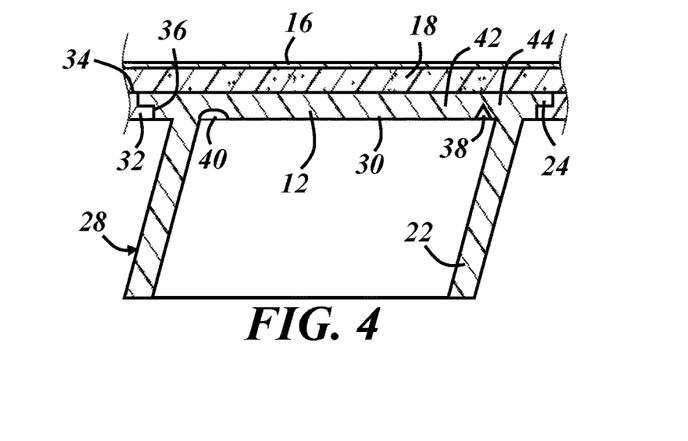
FIG. 4 is a cross-sectional view of an alternative construction of the vehicle interior panel of FIG. 1, illustrating a drop-in airbag chute.
Figure 5:
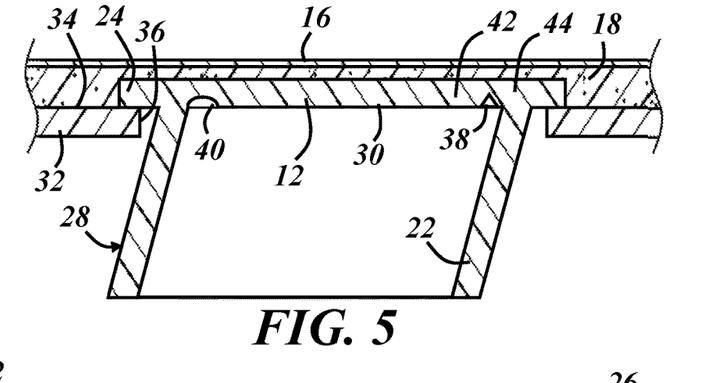
FIG. 5 is a cross-sectional view of an alternative construction of the vehicle interior panel of FIG. 1, illustrating another drop-in airbag chute.

In the variations of FIGS. 4 and 5, the chute 22 is part of a drop-in airbag module 28 and extends from a closed end 30 of the module. The closed end 30 of the module 28 forms part of the panel substrate 12 along with a larger and surrounding base portion 32 of the substrate. During assembly, the airbag module 28 is received from an outer side 34 and through an opening 36 of the base portion 32 of the substrate. In FIG. 4, the flange 24 engages a lip surrounding the opening 36 so that the closed end of the module is level with the outer side 34 of the base portion 32, and the foam layer 18 has a uniform thickness. In FIG. 5, the flange 24 rests on the outer side 34 of the base portion 32 and the foam layer 18 is formed-in-place to accommodate the substrate thickness variation caused by the overlapping flange and base portion 32.

The airbag canister 20 or uninflated airbag may be included as part of the airbag module 28. The chute 22 and closed end 30 of the module may be formed together in one piece and/or from a different material than the base portion 32 of the substrate 12. For example, the base portion 32 may be formed from a relatively rigid material, such as a fiber-reinforced thermoplastic, and the airbag module 28 may be formed from a relatively flexible material, such as TPE. Other configurations are possible.

In each case, the panel 10 includes a tear seam 38 formed in the substrate 12 and an airbag door hinge 40. In the illustrated examples, the tear seam 38 is formed as a notch and the hinge 40 is formed as a recess along the inner side 26 of the substrate 12. The apex of the notch runs along a U-shape at the desired location of a deployment opening through which the airbag will deploy into the passenger cabin. The notch may be continuous or discontinuous along its path. Airbag inflation forces are concentrated to much higher stresses at the tear seam 38 than away from the tear seam so that the substrate 12 splits along the tear seam during airbag deployment to form an airbag door on one side 42 of the tear seam (inside the U-shape of FIG. 1) that pivots about the hinge 40 and away from a portion of the substrate on an opposite side 44 of the tear seam.

The hinge 40 is configured to bend but not break. For example, the recess forming the illustrated hinge 40 has a relatively large radius compared to the notch of the tear seam 38 which allows the substrate 12 to be more flexible along the hinge without concentrating the airbag inflation forces to a level that will break the substrate along the hinge.

The illustrated configurations are non-limiting. For example, the tear seam 38 may include or be formed from a series of through-openings in the substrate, a series of blind laser-formed holes, or any other suitable feature that causes the substrate to split along that feature to form the airbag door. The substrate 12 may also be configured to split along the hinge 40 but can include tethers that anchor the airbag door to the remainder of the substrate at the hinge. Different tear seam shapes, such as H-shaped, X-shaped, Y-shaped, or curvilinear shapes are also possible. An H-shaped tear seam may be used to form dual airbag doors with opposing door edges at the crossbar of the H-shape, and an X-shaped tear seam may be used to form four triangular airbag doors with their apexes at the center of the X-shape, for example. One or more layers of the covering 14 may include a tear seam as well.

The panel 10 is formed with one or more relief lines 46. The relief lines 46 are stress management features configured to direct stresses to desired portions or points along the tear seam 38 while the substrate 12 is splitting to form the airbag door. In FIG. 1, the tear seam 38 is represented as a U-shaped dashed line, the hinge 40 is represented as a center line at the open end of the U-shape, and the relief lines 46 are represented as dotted lines extending between the hinge and the tear seam. None of these features of the panel 10 are visible in the vehicle passenger cabin due to concealment by the covering 14 and/or their location along the inner side of the substrate 12.

Figure 6:
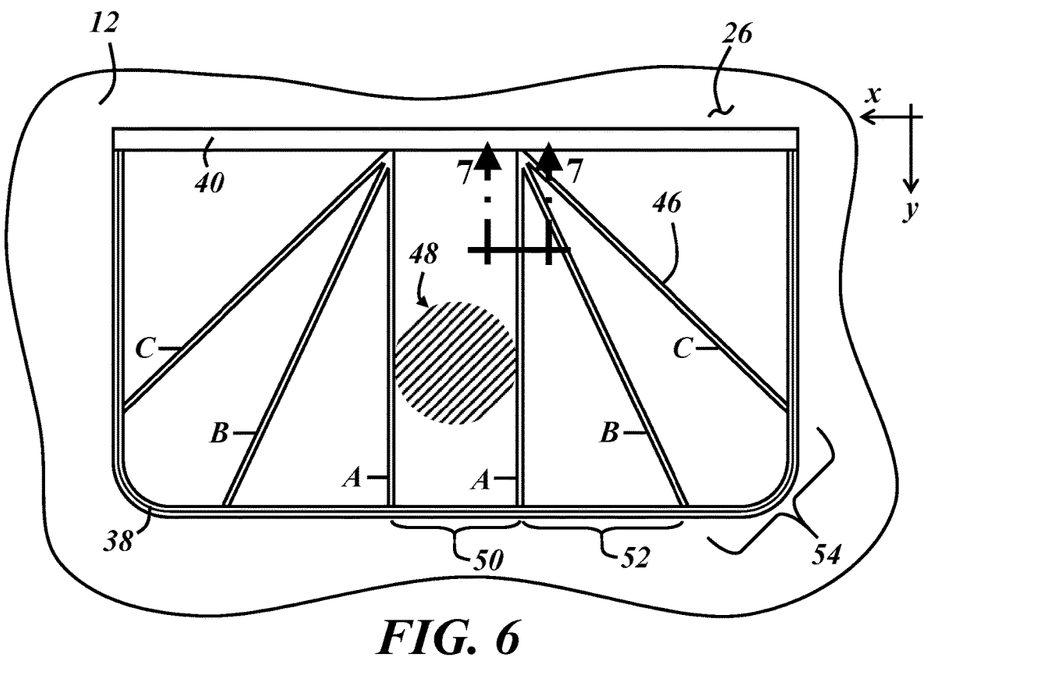
FIG. 6 is a plan view of a portion of an inner side of a substrate of the vehicle interior panel including relief lines extending from a tear seam.
Figure 7:
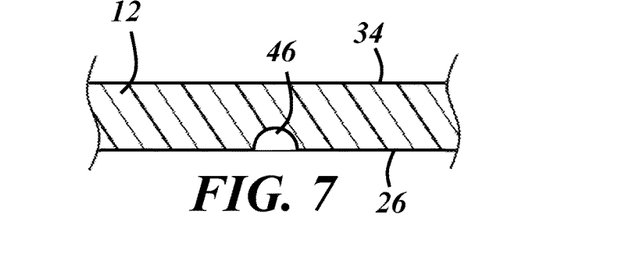
FIG. 7 is a cross-sectional view of a one of the relief lines of FIG. 6.

FIG. 6 is a plan view of the inner side 26 of the substrate 12, illustrating the tear seam 38, the hinge 40, and a plurality of relief lines 46, each of which are formed in the inner side of the substrate such that the local wall thickness is reduced. A cross-sectional view of one of the relief lines 46 is illustrated in FIG. 7. Similar to the hinge 40, each relief line 46 is configured to bend but not break and to allow the airbag door to preferentially bend along the relief line during airbag deployment and airbag door formation. Each relief line 46 may be in the form of a channel with a lesser channel depth and/or a greater radius of curvature than the tear seam notches or other tear seam features. The relief lines 46 may take other forms as well, such as very shallow score lines (e.g., less than 0.1 mm deep) or standing features with a sharp edge at their base. The relief line(s) can be formed along one or both of the inner side 26 and the outer side 34 of the substrate 12.

The relief lines 46 function by directing airbag inflation forces along their length to the tear seam 38. Accordingly, each relief line 46 extends from the tear seam 38 on the airbag door side 42 of the tear seam. In particular, each relief line 46 extends from the tear seam 38 in a direction toward the hinge 40. In the illustrated example, each relief line 46 extends from the tear seam 38 to the hinge 40, effectively interconnecting the hinge and tear seam. In the particularly illustrated embodiment, each relief line 46 extends from a distinct point along the tear seam to one of two common locations along the hinge 40, effectively dividing the airbag door portion 42 of the substrate 12 into multiple adjacent segments, including a central rectangular segment between a first pair (A) of relief lines, and three generally triangular segments that share an apex on each side of the rectangular segment.

The relief lines 46 are configured to function by way of the following explanation. FIG. 6 depicts a region 48 of initial application of airbag force near the center of the unformed airbag door. When a force is applied near the center of a flat panel without the illustrated relief lines, that force is initially distributed outwardly from the point of application in a manner that is generally equal in all planar directions. The relief lines 46 change that otherwise radially uniform force distribution. In the example of FIG. 6, each of the first pair A of relief lines 46 essentially reduces or prevents the force applied in region 48 from being distributed in the x-direction beyond pair A of the relief lines. In other words, the substrate 12 bends along the relief lines 46 at a relatively low force such that the remainder of the centrally applied force is distributed between the relief lines of pair A. The weakest part of the substrate 12 between the relief lines 46 of pair A is a central portion 50 of the tear seam 38, which thus becomes the first part of the tear seam to split.

In this manner, the relief lines 46 cause the tear seam 38 to reach its breaking stress sooner than it would be reached without the relief lines—i.e., without the relief lines not as much of the applied force would be concentrated at the central portion 50 of the tear seam because it would be partly distributed to portions of the substrate 12 beyond the central portion. Even if the tear seam 38 is configured so that the central portion 50 splits first—for example, if the notch is formed deeper at the central portion—the presence of the relief lines 46 still causes that central portion to reach its breaking stress sooner than it otherwise would.

Once the substrate 12 is split along the entire central portion 50 of the tear seam 38, more of the centrally applied net force of the inflating airbag is distributed in the x-direction beyond pair A of the relief lines 46. Then, a second pair (B) of relief lines 46 becomes a new boundary beyond which the distribution of force is lessened or prevented in the x-direction such that the applied force is concentrated along a second portion 52 of the tear seam, adjacent to and on opposite sides of the central portion 50 and bounded by relief lines 46 of pair A and pair B. Each of the relief lines 46 of pair B extends from a different point along the tear seam 38 than the relief lines of pair A, and each of the relief lines of pair B extends to the same location along the hinge 40 as the corresponding one of the relief lines of pair A. The oblique orientation of the relief lines 46 of pair B relative to the tear seam 38 and hinge 40 has the additional effect of lessening or preventing inflation forces from being distributed beyond the respective relief lines in the y-direction and thus maximizes the applied force along the second portion 52 of the tear seam.

Once the substrate 12 is split along the entire second portion 52 of the tear seam 38, more of the airbag inflation force is distributed in the x- and y-directions beyond pair B of the relief lines 46, and a third pair (C) of relief lines 46 becomes a new boundary beyond which the distribution of force is lessened or prevented. The applied force is then concentrated along corner portions 54 of the tear seam 38, bounded by the relief lines 46 of pairs B and C. Each of the relief lines 46 of pair C extends from a different point along the tear seam 38 than the relief lines of pairs A and B, and each of the relief lines of pair C extends to the same location along the hinge 40 as the corresponding relief lines of pairs A and B. In particular, the respective relief lines 46 of pairs A and B extend from different points along a portion of the tear seam corresponding to a leading edge of the airbag door being formed, and the relief lines of pair C extend from different points along a portion of the tear seam corresponding to side edges of the airbag door being formed. The oblique orientation of the relief lines 46 of pair C has a similar effect as pair B, maximizing the applied force along the corner portions 54 of the tear seam.

By the time the substrate 12 has split along portions 50-54 of the tear seam 38, the airbag has begun emerging along the leading edge of the airbag door, and the remainder of tear seam splits to form the side edges of the airbag door. The overall effect of the relief lines 46 is faster initiation of the tear seam splitting, a focusing of the airbag inflation forces toward the portion of the tear seam 38 that forms the leading edge of the airbag door, and a controlled direction of splitting along that portion of the tear seam. Without the relief lines 46, the entire airbag door tends to balloon up until some point along the tear seam reaches its tensile breaking stress, which leads to an unpredictable first split point and/or delays initiation of the splitting.

Figure 8:
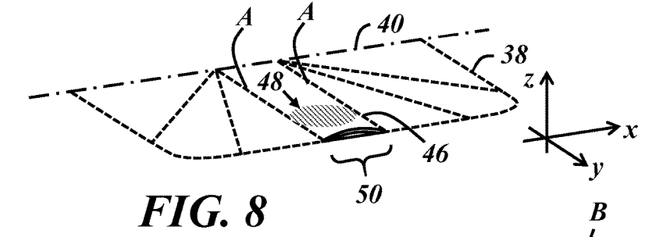
FIGS. 8-12 schematically depict an outer side of the substrate of FIG. 6 bending along the relief lines during sequential stages of airbag deployment.
Figure 9:
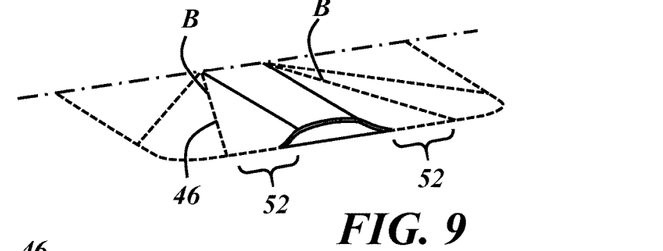
Figures 10, 11, 12:
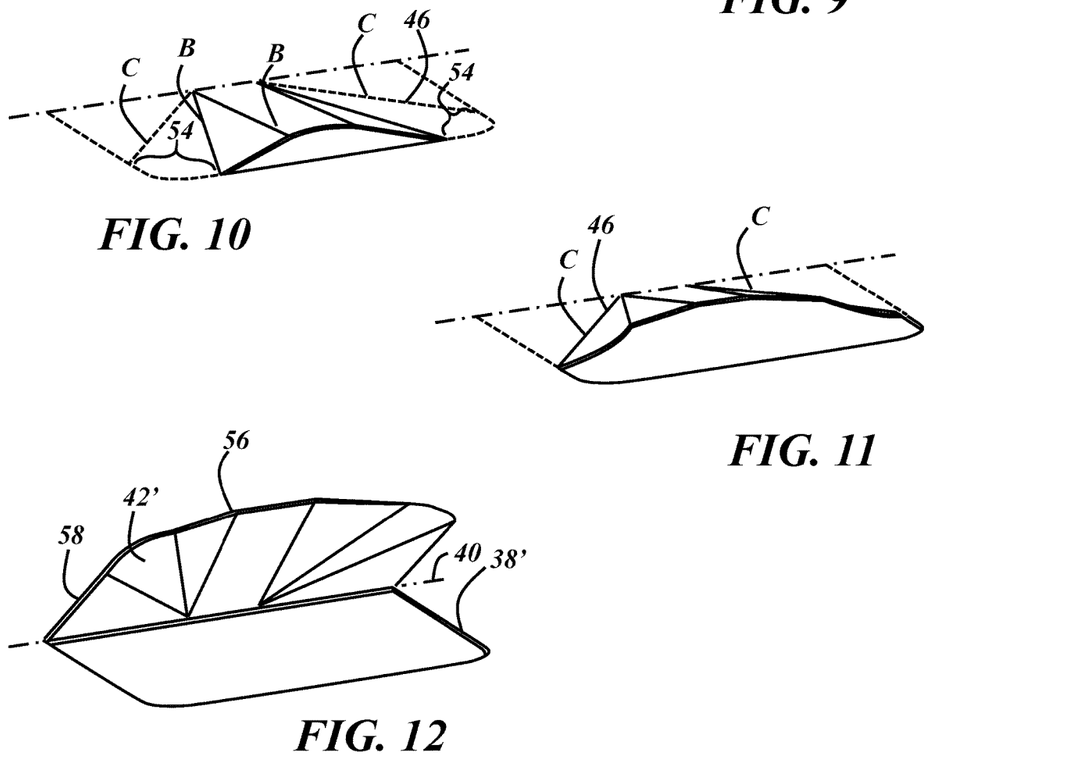
Figure 13:
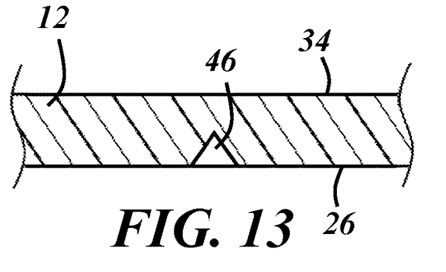
FIGS. 13-17 are cross-sectional views of relief lines with other cross-sectional shapes.
Figure 14:
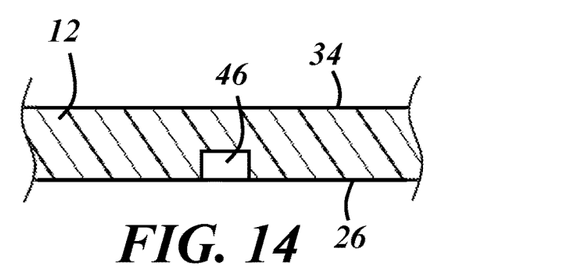
Figure 15:
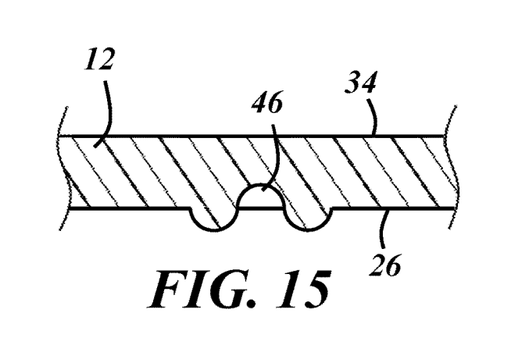
Figure 16:
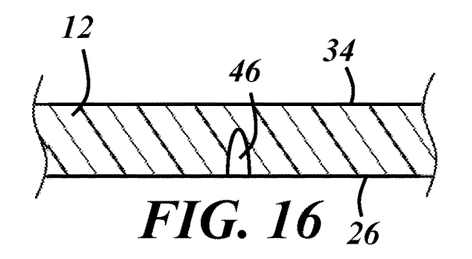
Figure 17:
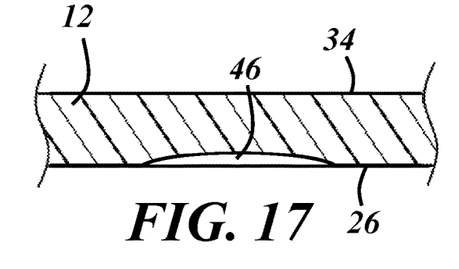

FIGS. 8-12 schematically depict the outer side of the substrate of FIG. 6 bending along the various relief lines 46 during the sequential stages of airbag deployment described above. The airbag is omitted for clarity. FIG. 8 shows the substrate split along the central portion 50 of the tear seam 38, after which more inflation force is distributed in the x-direction beyond the relief lines of pair A. Forces are then maximized along the second portion 52 of the tear seam due to the presence of pair B of the relief lines, beyond which the force distribution is lessened, and the substrate continues to split as shown in FIG. 9. In FIG. 10, the substrate is split along the entire central and second portions of the tear seam, after which more inflation force is distributed in the x- and y-directions beyond the relief lines of pair B but limited to corner portions 54 of the tear seam by the relief lines of pair C. Forces are thus maximized along the corner portions 54 until the substrate is split to the points where pair C of the relief lines extend from the tear seam as shown in FIG. 11. FIG. 12 illustrates a fully formed airbag door 42' and deployment opening 38'. The airbag door 42' is pivoted about the hinge 40 and has a leading edge 56 on a side of the door opposite the hinge, along with opposite side edges 58 extending between the leading edge and the hinge. The deployment opening 38' in this case is defined in part by the former location of the tear seam and is further defined by the hinge 40.

The particular arrangement and configuration of the tear seam 38, hinge 40, and relief lines 46 illustrated in the figures is merely exemplary. As few as one relief line 46 may be advantageously employed to concentrate airbag inflation forces to a particular point along the tear seam, 38 and there is no practical limit to the number of relief lines. Further, the relief lines 46 need not extend entirely to the hinge 40 to have an advantageous effect, nor are they required to be perfectly straight along their entire length. In some embodiments, a plurality of relief lines extend from distinct points along the tear seam to a single common location along or near the hinge.

FIGS. 13-17 illustrate additional non-limiting cross-sectional shapes for each relief line 46. The relief line 46 of FIG. 13 has a triangular cross-section, and the relief line of FIG. 14 has a rectangular cross-section. The relief line 46 of FIG. 15 includes a central channel with a rounded or curved cross-section, similar to that of FIG. 7, with parallel ridges running along opposite sides of the channel that can enhance the concentration of forces along the center channel. The relief lines 46 of FIGS. 16 and 17 include cross-sectional shapes with relatively high or low aspect ratios—i.e., the ratio of depth to width. For example, while the channels of the relief lines 46 of FIGS. 7 and 13-15 have aspect ratios between 0.5 and 1.0, the relief line of FIG. 16 has an aspect ratio of greater than 1.5 and the relief line of FIG. 17 has an aspect ratio of less than 0.5 and, more particularly, less than 0.25. In various embodiments, each relief line 46 may have a depth and/or width that varies along the length of the relief line. Each relief line 46 may also be discontinuous, such as in the form of a series of spaced blind holes along a desired path.

Figure 18:
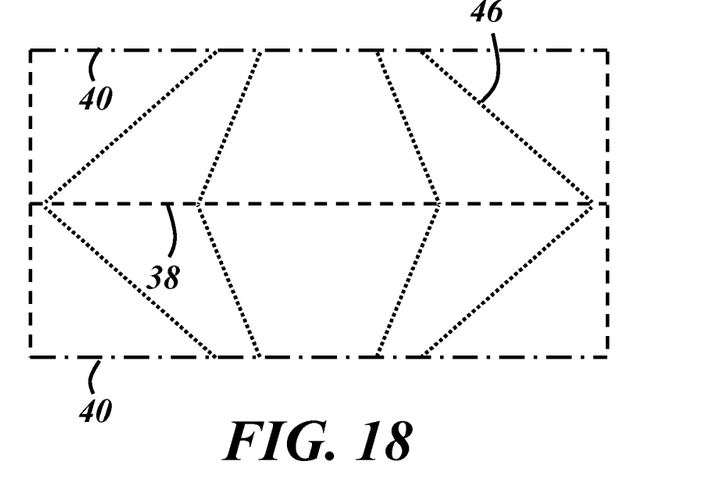
FIGS. 18 and 19 are schematic illustrations of other tear seam shapes and relief line locations and orientations.
Figure 19:
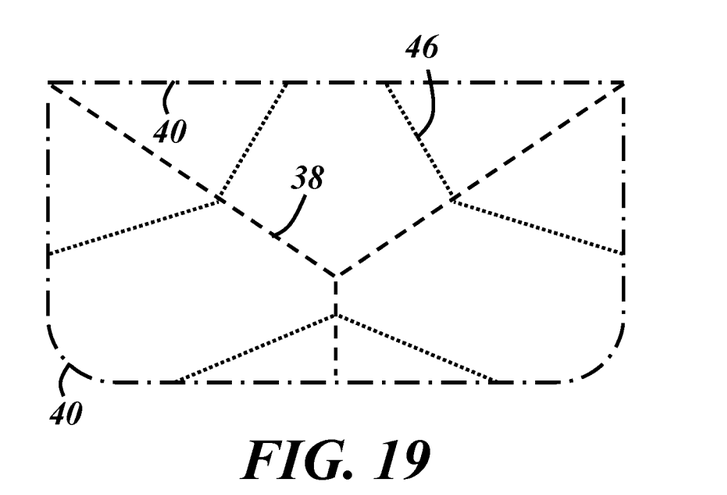

FIGS. 18 and 19 schematically illustrate additional non-limiting tear seam shapes and relief line locations and orientations. As in FIG. 1, each tear seam 38 is illustrated as a dashed line, each hinge 40 as a center line, and each relief line 46 as a dotted line. FIG. 18 depicts an H-shaped tear seam 38 along which the substrate splits to form a pair of airbag doors with the leading edges of the airbag doors being formed along the cross-bar of the H-shape. Each airbag door is rectangular and pivots about a respective one of the hinges 40, each hinge being parallel with the cross-bar of the H-shape and the leading edges of the airbag doors. The resulting deployment opening is rectangular with an area twice that of each individual airbag door. As in the previous example, each relief line 46 extends from a point along the tear seam 38 and toward one of the airbag door hinges 40. The relief lines 46 function in generally the same manner described above and effectively divide the airbag door portion of the substrate into multiple adjacent segments along which the tear seam 38 is sequentially split.

FIG. 19 depicts a Y-shaped tear seam 38 along which the substrate splits to form a trio of adjacent airbag doors, each of which shares edges with the others. Each airbag door is pivots about a respective hinge 40. In the illustrated example, the hinge 40 across the top of the Y-shape is rectilinear and the other two hinges are curvilinear. As in the previous examples, each relief line 46 extends from a point along the tear seam 38 and toward one of the airbag door hinges 40. The relief lines 46 function in generally the same manner described above and effectively divide the airbag door portion of the substrate into multiple adjacent segments along which the tear seam 38 is sequentially split.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A vehicle interior panel for use over a deployable airbag, the panel comprising:
   a substrate configured to split along a tear seam during airbag deployment to form an airbag door on one side of the tear seam that pivots about a hinge away from a portion of the substrate on an opposite side of the tear seam; and
   a plurality of relief lines formed in the substrate and extending from the tear seam on the airbag door side of the tear seam, each relief line being configured to allow the airbag door to bend along one or more of the relief lines during airbag deployment,
   wherein a first relief line of the plurality extends from a first point along the tear seam and a second relief line of the plurality extends from a different second point along the tear seam to concentrate airbag deployment forces along a portion of the tear seam between said first and second points so that the substrate splits along said portion before splitting along a different portion of the tear seam during airbag deployment.

2. The vehicle interior panel of claim 1, wherein at least one relief line extends from the tear seam toward the hinge.

3. The vehicle interior panel of claim 1, wherein at least one relief line extends from the tear seam to the hinge.

4. The vehicle interior panel of claim 1, wherein each relief line extends from the tear seam toward the hinge.

5. The vehicle interior panel of claim 1, wherein each relief line extends from the tear seam to the hinge.

6. The vehicle interior panel of claim 1, wherein each relief line extends from the tear seam to a common location along the hinge.

7. The vehicle interior panel of claim 1, wherein each relief line extends from the tear seam to a different location along the hinge.

8. The vehicle interior panel of claim 1, wherein at least two of the plurality of relief lines extend from the tear seam to a first location along the hinge, and at least two other of the plurality of relief lines extend from the tear seam to a different second location along the hinge.

9. The vehicle interior panel of claim 8, wherein one of the relief lines extending to the first location is parallel with one of the relief lines extending to the second location.

10. The vehicle interior panel of claim 1, wherein at least one of said different points corresponds to a leading edge of the airbag door and another one of said different points corresponds to a different edge of the airbag door.

11. The vehicle interior panel of claim 1, wherein each of said different points corresponds to a leading edge of the airbag door and a third relief line of the plurality extends from a different third point corresponding to a different edge of the airbag door.

12. The vehicle interior panel of claim 1, wherein the plurality of relief lines includes first, second, and third pairs of relief lines with each pair including one relief line extending to a first location along the hinge and another relief line extending to a different second location along the hinge,
the relief lines of the first pair being parallel with each other,
the relief lines of the second pair extending from respective points along the tear seam corresponding to a leading edge of the airbag door, and
the relief lines of the third pair extending from respective points along the tear seam corresponding to a different edge of the airbag door.

13. The vehicle interior panel of claim 1, wherein the at least one relief line comprises a channel formed along a side of the substrate facing the deployable airbag when installed in a vehicle.

14. The vehicle interior panel of claim 1, wherein the substrate is formed in part by a closed end of an airbag module configured for attachment to a base portion of the substrate at an opening formed through the base portion.

15. The vehicle interior panel of claim 1,
wherein at least one of the plurality of relief lines forms an oblique angle with the tear seam.

16. The vehicle interior panel of claim 15, wherein at least one of the plurality of relief lines forms an angle with the tear seam that is different from an angle formed by another one of the relief lines.

17. The vehicle interior panel of claim 1,
wherein at least one of the plurality of relief lines forms an angle with the tear seam that is different from an angle formed by another one of the relief lines with the tear seam.

* * * * *